United States Patent
Shilts et al.

(10) Patent No.: US 9,727,063 B1
(45) Date of Patent: Aug. 8, 2017

(54) THERMOSTAT SET POINT IDENTIFICATION

(71) Applicant: OPOWER, INC., Arlington, VA (US)

(72) Inventors: Erik Shilts, Washington, DC (US); Yoni Ben-Meshulam, Brooklyn, NY (US); Ben Packer, Palo Alto, CA (US); Richard Tyler Curtis, Washington, DC (US)

(73) Assignee: OPOWER, INC., Arlington, VA (US)

( * ) Notice: Subject to any disclaimer, the term of this patent is extended or adjusted under 35 U.S.C. 154(b) by 476 days.

(21) Appl. No.: 14/242,333

(22) Filed: Apr. 1, 2014

(51) Int. Cl.
| | |
|---|---|
| *G01M 1/38* | (2006.01) |
| *G05B 13/00* | (2006.01) |
| *G05B 15/00* | (2006.01) |
| *G05D 23/00* | (2006.01) |
| *G05D 23/19* | (2006.01) |

(52) U.S. Cl.
CPC ................................ *G05D 23/1917* (2013.01)

(58) Field of Classification Search
None
See application file for complete search history.

(56) References Cited

U.S. PATENT DOCUMENTS

| | | | |
|---|---|---|---|
| 4,334,275 A | 6/1982 | Levine | |
| 4,843,575 A | 6/1989 | Crane | |
| 5,513,519 A | 5/1996 | Cauger et al. | |
| 5,566,084 A | 10/1996 | Cmar | |
| 5,717,609 A | 2/1998 | Packa et al. | |
| 5,855,011 A | 12/1998 | Tatsuoka | |
| 5,873,251 A | 2/1999 | Iino | |
| 5,930,773 A | 7/1999 | Crooks et al. | |
| 5,930,803 A | 7/1999 | Becker et al. | |
| 5,948,303 A | 9/1999 | Larson | |
| 6,035,285 A | 3/2000 | Schlect et al. | |
| 6,088,688 A | 7/2000 | Crooks et al. | |

(Continued)

FOREIGN PATENT DOCUMENTS

| | | |
|---|---|---|
| AU | 2010315015 | 7/2014 |
| CA | 2779754 | 5/2011 |

(Continued)

OTHER PUBLICATIONS

Charlton et al., Graph-based algorithms for comparison and prediction of household-level energy use profiles, Researchgate.net, Oct. 2013, 6 pages.*

(Continued)

*Primary Examiner* — Diem Cao
(74) *Attorney, Agent, or Firm* — Cooper Legal Group, LLC (57) ABSTRACT

A thermostat set point estimation method and system that selects a plurality of candidate thermostat set points, determines for each of the plurality of candidate thermostat set points a predicted energy usage amount corresponding to the candidate thermostat set point, determines for each of the plurality of candidate thermostat set points an error value corresponding to the candidate thermostat set point using an actual energy usage amount and the predicted energy usage amount corresponding to the candidate thermostat set point, and identifies an estimated thermostat set point by selecting the candidate thermostat set point having the error value that is lowest from the plurality of candidate thermostat set points.

21 Claims, 5 Drawing Sheets

(56) References Cited

U.S. PATENT DOCUMENTS

| | | |
|---|---|---|
| 6,295,504 B1 | 9/2001 | Ye et al. |
| 6,327,605 B2 | 12/2001 | Arakawa et al. |
| D462,077 S | 8/2002 | Greminger |
| 6,606,104 B1 | 8/2003 | Kondo et al. |
| 6,701,298 B1 | 3/2004 | Jutsen |
| 6,732,055 B2 | 5/2004 | Bagepalli et al. |
| 6,778,945 B2 | 8/2004 | Chassin et al. |
| 6,785,620 B2 | 8/2004 | Kishlock et al. |
| 6,972,660 B1 | 12/2005 | Montgomery, Jr. et al. |
| 7,020,508 B2 | 3/2006 | Stivoric et al. |
| 7,073,073 B1 | 7/2006 | Nonaka et al. |
| 7,073,075 B2 | 7/2006 | Freyman et al. |
| 7,136,710 B1 | 11/2006 | Hoffberg et al. |
| 7,142,949 B2 | 11/2006 | Brewster et al. |
| 7,149,727 B1 | 12/2006 | Nicholls et al. |
| 7,200,468 B2 | 4/2007 | Ruhnke et al. |
| 7,243,044 B2 | 7/2007 | McCalla |
| 7,333,880 B2 | 2/2008 | Brewster et al. |
| 7,356,548 B1 | 4/2008 | Culp et al. |
| 7,444,251 B2 | 10/2008 | Nikovski et al. |
| 7,460,502 B2 | 12/2008 | Arima et al. |
| 7,460,899 B2 | 12/2008 | Almen |
| 7,552,030 B2 | 6/2009 | Guralnik et al. |
| 7,561,977 B2 | 7/2009 | Horst et al. |
| D605,652 S | 12/2009 | Plaisted et al. |
| 7,878,890 B2 | 2/2011 | Toyohara et al. |
| 7,991,513 B2 | 8/2011 | Pitt |
| 8,065,098 B2 | 11/2011 | Gautam |
| 8,166,047 B1 | 4/2012 | Cohen et al. |
| D660,867 S | 5/2012 | Marchetti |
| 8,180,591 B2 | 5/2012 | Yuen et al. |
| D665,411 S | 8/2012 | Rai et al. |
| 8,239,178 B2 | 8/2012 | Gray et al. |
| D667,841 S | 9/2012 | Rai et al. |
| 8,260,468 B2 | 9/2012 | Ippolito et al. |
| 8,275,635 B2 | 9/2012 | Stivoric et al. |
| 8,280,536 B1 | 10/2012 | Fadell et al. |
| D671,550 S | 11/2012 | Chen et al. |
| 8,348,840 B2 | 1/2013 | Heit et al. |
| 8,375,118 B2 | 2/2013 | Hao et al. |
| 8,417,061 B2 | 4/2013 | Kennedy et al. |
| 8,428,785 B2 | 4/2013 | Boucher et al. |
| 8,429,630 B2 | 4/2013 | Nickolov et al. |
| 8,478,447 B2 | 7/2013 | Fadell et al. |
| 8,489,245 B2 | 7/2013 | Carrel et al. |
| D687,445 S | 8/2013 | Fuhrmann |
| D694,252 S | 11/2013 | Helm |
| 8,583,288 B1 | 11/2013 | Rossi et al. |
| D697,526 S | 1/2014 | Bruck et al. |
| 8,630,741 B1 | 1/2014 | Matsuoka et al. |
| 8,660,813 B2 | 2/2014 | Curtis et al. |
| D703,690 S | 4/2014 | MacCubbin et al. |
| 8,690,751 B2 | 4/2014 | Auphan |
| D707,245 S | 6/2014 | Bruck et al. |
| 8,751,432 B2 | 6/2014 | Berg-Sonne et al. |
| D710,871 S | 8/2014 | McCormack et al. |
| 8,805,000 B2 | 8/2014 | Derby et al. |
| 8,818,758 B1 | 8/2014 | Singh et al. |
| D714,335 S | 9/2014 | Cojuangco et al. |
| 8,868,248 B2 | 10/2014 | Park |
| D717,328 S | 11/2014 | Lin |
| D720,767 S | 1/2015 | Miller et al. |
| 8,954,849 B2 | 2/2015 | Doi et al. |
| D725,133 S | 3/2015 | Smirin et al. |
| D725,664 S | 3/2015 | Nies et al. |
| D729,268 S | 5/2015 | Nies et al. |
| D730,386 S | 5/2015 | Ryan et al. |
| 9,031,703 B2 | 5/2015 | Nakamura et al. |
| D731,538 S | 6/2015 | Lee |
| D732,049 S | 6/2015 | Amin |
| D732,062 S | 6/2015 | Kwon |
| D740,847 S | 10/2015 | Yampolskiy et al. |
| 2001/0047290 A1 | 11/2001 | Petras et al. |
| 2002/0065581 A1 | 5/2002 | Fasca |
| 2002/0178047 A1 | 11/2002 | Or et al. |
| 2002/0198629 A1 | 12/2002 | Ellis |
| 2003/0011486 A1 | 1/2003 | Ying |
| 2003/0018517 A1 | 1/2003 | Dull et al. |
| 2003/0023467 A1 | 1/2003 | Moldovan |
| 2003/0216971 A1 | 11/2003 | Sick et al. |
| 2004/0024717 A1 | 2/2004 | Sneeringer |
| 2004/0111410 A1 | 6/2004 | Burgoon et al. |
| 2004/0140908 A1 | 7/2004 | Gladwin et al. |
| 2005/0102068 A1* | 5/2005 | Pimputkar ............... H02J 3/14 700/291 |
| 2005/0257540 A1 | 11/2005 | Choi et al. |
| 2006/0089851 A1 | 4/2006 | Silby et al. |
| 2006/0093222 A1 | 5/2006 | Saffer et al. |
| 2006/0103549 A1 | 5/2006 | Hunt et al. |
| 2006/0195438 A1 | 8/2006 | Galuten |
| 2006/0246968 A1 | 11/2006 | Dyke-Wells |
| 2007/0061735 A1 | 3/2007 | Hoffberg et al. |
| 2007/0185835 A1 | 8/2007 | Ursitti et al. |
| 2007/0198459 A1 | 8/2007 | Boone et al. |
| 2007/0203860 A1 | 8/2007 | Golden et al. |
| 2007/0213992 A1 | 9/2007 | Anderson et al. |
| 2007/0255457 A1 | 11/2007 | Whitcomb et al. |
| 2007/0260405 A1 | 11/2007 | McConnell et al. |
| 2008/0027885 A1 | 1/2008 | van Putten et al. |
| 2008/0033587 A1 | 2/2008 | Kurita et al. |
| 2008/0167535 A1 | 7/2008 | Stivoric et al. |
| 2008/0189632 A1 | 8/2008 | Tien et al. |
| 2008/0195561 A1 | 8/2008 | Herzig |
| 2008/0222561 A1 | 9/2008 | Helfman et al. |
| 2008/0244429 A1 | 10/2008 | Stading |
| 2008/0281473 A1 | 11/2008 | Pitt |
| 2008/0281763 A1 | 11/2008 | Yliniemi |
| 2008/0304112 A1 | 12/2008 | Matsuno |
| 2008/0306985 A1 | 12/2008 | Murray et al. |
| 2009/0106202 A1 | 4/2009 | Mizrahi |
| 2009/0106674 A1 | 4/2009 | Bray et al. |
| 2009/0204267 A1 | 8/2009 | Sustaeta et al. |
| 2009/0217175 A1 | 8/2009 | Bechtel et al. |
| 2009/0217179 A1 | 8/2009 | Mons et al. |
| 2009/0326726 A1 | 12/2009 | Ippolito et al. |
| 2010/0025483 A1 | 2/2010 | Hoeynck et al. |
| 2010/0076835 A1 | 3/2010 | Silverman |
| 2010/0082174 A1 | 4/2010 | Weaver |
| 2010/0099954 A1 | 4/2010 | Dickinson et al. |
| 2010/0106575 A1 | 4/2010 | Bixby et al. |
| 2010/0138363 A1 | 6/2010 | Batterberry et al. |
| 2010/0156665 A1 | 6/2010 | Krzyzanowski et al. |
| 2010/0179704 A1 | 7/2010 | Ozog |
| 2010/0180223 A1 | 7/2010 | Speier |
| 2010/0198713 A1 | 8/2010 | Forbes, Jr. et al. |
| 2010/0217452 A1 | 8/2010 | McCord et al. |
| 2010/0217549 A1 | 8/2010 | Galvin et al. |
| 2010/0217550 A1 | 8/2010 | Crabtree et al. |
| 2010/0217642 A1 | 8/2010 | Crubtree et al. |
| 2010/0217651 A1 | 8/2010 | Crabtree et al. |
| 2010/0232671 A1 | 9/2010 | Dam et al. |
| 2010/0241648 A1 | 9/2010 | Ito et al. |
| 2010/0286937 A1 | 11/2010 | Hedley et al. |
| 2010/0289643 A1 | 11/2010 | Trundle et al. |
| 2010/0324962 A1 | 12/2010 | Nesler et al. |
| 2010/0332373 A1 | 12/2010 | Crabtree et al. |
| 2011/0022429 A1 | 1/2011 | Yates et al. |
| 2011/0023045 A1 | 1/2011 | Yates et al. |
| 2011/0040666 A1 | 2/2011 | Crabtree et al. |
| 2011/0061014 A1 | 3/2011 | Frader-Thompson et al. |
| 2011/0063126 A1 | 3/2011 | Kennedy et al. |
| 2011/0106316 A1 | 5/2011 | Drew et al. |
| 2011/0106328 A1 | 5/2011 | Zhou et al. |
| 2011/0106471 A1 | 5/2011 | Curtis et al. |
| 2011/0153102 A1 | 6/2011 | Tyagi et al. |
| 2011/0178842 A1 | 7/2011 | Rane et al. |
| 2011/0178937 A1 | 7/2011 | Bowman |
| 2011/0205245 A1 | 8/2011 | Kennedy et al. |
| 2011/0231320 A1 | 9/2011 | Irving |
| 2011/0251730 A1 | 10/2011 | Pitt |
| 2011/0251807 A1 | 10/2011 | Rada et al. |
| 2011/0282505 A1 | 11/2011 | Tomita et al. |
| 2011/0313964 A1 | 12/2011 | Sanchey Loureda et al. |
| 2012/0036250 A1 | 2/2012 | Vaswani et al. |

(56) References Cited

U.S. PATENT DOCUMENTS

| | | | |
|---|---|---|---|
| 2012/0053740 A1 | 3/2012 | Venkatakrishnan et al. | |
| 2012/0066168 A1 | 3/2012 | Fadell et al. | |
| 2012/0078417 A1 | 3/2012 | Connell, II et al. | |
| 2012/0084063 A1* | 4/2012 | Drees | G06Q 10/06 703/6 |
| 2012/0179692 A1 | 7/2012 | Hsiao et al. | |
| 2012/0215369 A1 | 8/2012 | Desai et al. | |
| 2012/0216123 A1 | 8/2012 | Shklovskii et al. | |
| 2012/0259678 A1 | 10/2012 | Overturf et al. | |
| 2012/0290230 A1 | 11/2012 | Berges Gonzalez et al. | |
| 2012/0310708 A1 | 12/2012 | Curtis et al. | |
| 2013/0060531 A1 | 3/2013 | Burke et al. | |
| 2013/0060720 A1 | 3/2013 | Burke | |
| 2013/0097177 A1 | 4/2013 | Fan et al. | |
| 2013/0097481 A1 | 4/2013 | Kotler et al. | |
| 2013/0173064 A1 | 7/2013 | Fadell et al. | |
| 2013/0190940 A1* | 7/2013 | Sloop | G05B 15/02 700/291 |
| 2013/0253709 A1 | 9/2013 | Renggli et al. | |
| 2013/0261799 A1 | 10/2013 | Kuhlmann et al. | |
| 2013/0262040 A1 | 10/2013 | Buckley | |
| 2014/0006314 A1 | 1/2014 | Yu et al. | |
| 2014/0019319 A1 | 1/2014 | Derby et al. | |
| 2014/0074300 A1 | 3/2014 | Shilts et al. | |
| 2014/0107850 A1 | 4/2014 | Curtis | |
| 2014/0148706 A1 | 5/2014 | Van Treeck et al. | |
| 2014/0163746 A1 | 6/2014 | Drew et al. | |
| 2014/0207292 A1 | 7/2014 | Ramagem et al. | |
| 2014/0324244 A1* | 10/2014 | Musunuri | G05B 15/02 700/299 |
| 2014/0332195 A1* | 11/2014 | Liberman | G05D 23/1917 165/267 |
| 2014/0337107 A1 | 11/2014 | Foster | |
| 2015/0198345 A1* | 7/2015 | Bicknell | G05B 15/02 700/276 |
| 2015/0227522 A1 | 8/2015 | O'Donnell et al. | |
| 2015/0227846 A1 | 8/2015 | Mercer et al. | |
| 2015/0254246 A1 | 9/2015 | Sheth et al. | |
| 2015/0267935 A1 | 9/2015 | Devenish et al. | |
| 2015/0269664 A1 | 9/2015 | Davidson | |
| 2015/0276495 A1* | 10/2015 | Smullin | G01K 3/04 702/130 |
| 2015/0300831 A1 | 10/2015 | Sernicola | |
| 2015/0310019 A1 | 10/2015 | Royer et al. | |
| 2015/0310463 A1 | 10/2015 | Turfboer et al. | |
| 2015/0310465 A1 | 10/2015 | Chan et al. | |
| 2015/0319119 A1 | 11/2015 | Ryu et al. | |
| 2015/0324819 A1 | 11/2015 | Lin et al. | |
| 2015/0326679 A1 | 11/2015 | Lin et al. | |

FOREIGN PATENT DOCUMENTS

| | | |
|---|---|---|
| CA | 2832211 | 11/2012 |
| DE | 3703387 | 8/1987 |
| DE | 102011077522 | 12/2012 |
| EP | 0003010 | 7/1979 |
| EP | 2705440 | 3/2014 |
| EP | 2496991 | 9/2014 |
| GB | 1525656 | 9/1978 |
| GB | 2238405 | 5/1991 |
| JP | 2000-270379 | 9/2000 |
| JP | 2004-233118 | 8/2004 |
| JP | 2006-119931 | 5/2006 |
| JP | 2007-133468 | 5/2007 |
| JP | 2011-027305 | 2/2011 |
| JP | 2012-080679 | 4/2012 |
| JP | 2012-080681 | 4/2012 |
| JP | 2013-020307 | 1/2013 |
| WO | WO 03/102865 | 12/2003 |
| WO | WO 03/104941 | 12/2003 |
| WO | WO 2008/101248 | 8/2008 |
| WO | WO 2009/085610 | 7/2009 |
| WO | WO 2011/057072 | 5/2011 |
| WO | WO 2012/112358 | 8/2012 |
| WO | WO 2012/154566 | 11/2012 |
| WO | WO 2014/004148 | 1/2014 |
| WO | WO 2014/182656 | 11/2014 |

OTHER PUBLICATIONS

International Search Report and Written Opinion for PCT Application No. PCT/US2015/038692, mailed Sep. 24, 2015, 13 pages.

International Preliminary Report on Patentability for PCT Application No. PCT/US2010/055621, mailed May 15, 2012, 8 pages.

International Search Report and Written Opinion for PCT Application No. PCT/US2010/055621, mailed Dec. 23, 2010, 9 pages.

International Search Report and Written Opinion for PCT Application No. PCT/US2012/036539, mailed Jul. 6, 2012, 8 pages.

International Preliminary Report on Patentability for PCT Application No. PCT/US2012/036539, mailed Nov. 21, 2013, 7 pages.

International Search Report and Written Opinion for PCT Application No. PCT/US2013/046126, mailed Aug. 22, 2013, 9 pages.

International Preliminary Report on Patentability for PCT Application No. PCT/US2013/046126, mailed Jan. 8, 2015, 8 pages.

International Search Report for PCT Application No. PCT/US2014/036901, mailed Aug. 28, 2014, 3 pages.

Patent Examination Report No. 1 for Australian Patent Application No. 2010315015, dated Dec. 17, 2013, 3 pages.

Extended European Search Report for European Patent Application No. 12782569.3, dated Nov. 27, 2014, 7 pages.

Aragon, Liz, "Black and White Emoticons," posted at Sweet Clip Art, posting date Apr. 29, 2012. © 2011 2015 Elizabeth J. Aragon, available at http://sweetclipart.com/blackandwhiteemoticons838>.

Author Unknown, "An Inconvenient Truth," Jan. 9, 2008, 2 pages, available at http://web.archive.org/web/2008019005509/http://www.climatecrisis.net/takeaction/carbonca/.

Author Unknown, "Calculate Your Impact," Jul. 28, 2008, 4 pages, available at http://web.archive.org/web/20080728161614/http://green.yahoo.com/calculator/.

Author Unknown, "Carbon Footprint Calculator: What's My Carbon Footprint?" The Nature Conservancy, Jul. 8, 2008, 8 pages, available at http://web.archive.org/web/20080708193253/http://www.nature.org/initiatives/climatechange/calculator/2008.

Author Unknown, "CoolClimate Calculator," May 19,2008, 15 pages, available at http://web.archive.orgi/web/20080519220643/bie.berkeley.edu/coolcalc/calculations.html.

Author Unknown, "Lifecycle Climate Footprint Calculator," Berkeley Institute of the Environment, Nov. 23, 2007, 6 pages, available at http://web.archive.org/web/20071123115832/http://bie.berkeley.edu/calculator.

Author Unknown, "More than just a thermostat.," http://www.ecobee.com/, 4 pages, Jul. 16, 2013.

Author Unknown, "Popups Climate Change: Carbon Calculator—Greenhouse Gas and Carbon Dioxide Calculator Wed Pages," The Nature Conservancy, 5 pages, Feb. 29, 2008, available at http://web.archive.org/web/20080229072420/www.nature.org/popups/misc/art20625.html.

Bailey, Timothy, et al., "Fitting a Mixture Model by Expectation Maximization to Discover Motifs in Biopolymers," UCSD Technical Report CS94-351, Proceedings of the Second International Conf. on Intelligent Systems for Molecular Biology, 1994, 33 pages.

Blaine, Joel, "Seven Cities and a Utility Company Team Up to Deliver Energy Savings," posted at Dept. of Energy, posting date Aug. 1, 2011, available at http://energy.gov/articles/sevencitiesandutilitycompanyteamdeliversresidentialenergysavings>.

Chen, Hanfeng, et al., "Testing for a Finite Mixture Model With Two Components," Journal of the Royal Statistical Society, Series B, vol. 66, No. 1, 26 pages, 2004.

De Prensa, Boletine, "TXU Energy Budget Alerts Give Consumers Control of Electricity Costs," TXU Energy, http://www.txu.com/es/about/press, 2 pages, May 23, 2012.

Deb, Partha, "Finite Mixture Models," Hunter College and the Graduate Center, CUNY NBER, FMM Slides, 42 pages, Jul. 2008.

(56) References Cited

OTHER PUBLICATIONS

D'Urso, M., et al., "A Simple Strategy for Life Signs Detection Via an X-Band Experimental Set-Up," Progress in Electromagnectics Research C, vol. 9, pp. 119-129 (2009).
Eckmann, J.P., et al., "Ergodic theory of chaos and strange attractors," Reviews of Modern Physics, vol. 57, No. 3, Part I, pp. 617-656, Jul. 1985.
Espinoza, Marcelo, et al., "Short-Term Load Forecasting, Profile Identification, and Customer Segmentation: A Methodology Based on Periodic Time Series," IEEE Transactions on Power Systems, vol. 20, No. 3, pp. 1622-1630, Aug. 2005.
Fels, Margaret F., "PRISM: An Introduction," Elsevier Sequoia, Energy and Buildings, vol. 9, pp. 5-18, 1986.
Fels, Margaret F., et al., Seasonality of Non-heating Consumption and Its effect on PRISM Results, Elsevier Sequoia, Energy and Buildings, vol. 9, pp. 139-148, 1986.
Figueiredo, Vera, et al., "An Electric Energy Consumer Characterization Framework Based on Data Mining Techniques," IEEE Transactions on Power Systems, vol. 20, No. 2, pp. 596-602, May 2005.
Fitbit® Official Site, "Flex, One & Zip Wireless Activity & Sleep Trackers," http://www.fitbit.com/, 4 pages, Jul. 15, 2013.
FREEPIK, Surprised emoticon square face with open eyes and mouth, posted at Flat Icon, posting date not given. © 2013-2015 Graphic Resources SL, available at http://www.flaticon.com/freeicon/surprisedemoticonsquarefacewithopeneyesandmouth_42835>.
Friedman, Jerome, et al., "Regularization Paths for Generalized Linear Models via Coordinate Descent," Journal of Statistical Sotfware, vol. 33, Iss. 1, pp. 1-22, Jan. 2010.
Gelber, Bob, "This Is Not a Bill," posted at Not a Mystery, posting date Apr. 181, 2015, available at http://notamystery.com/2015/04/18/not_worth_the_papeUts$_{13}$ printed_on/>.
Goldberg, Miriam L., et al., "Refraction of PRISM Results into Components of Saved Energy," Elsevier Sequoia, Energy and Buildings, vol. 9, pp. 169-180, 1986.
Jansen, R.C., "Maximum Likelihood in a Generalized Linear Finite Mixture Model by Using the EM Algorithm," Biometrics, vol. 49, pp. 227-231, Mar. 1993.
Jawbone, "Know yourself. Live better." https://jawbone.com/up/, 7 pages, Jul. 15, 2013.
Karsten, "Green nudge: The classic social comparison experiment by Opower," posted at iNudgeyou, posting date Nov. 28, 2012, available at http://inudgeyou.com/greennudgetheclassicsocialcomparisonexperimenbyopower/>.
Laskey, Alex, et al., "OPOWER," posted at ACM, posting date Jun. 2011, Copyright © 2015 by the ACM, available at http://xrds.acm.org/article.cfm?aid=1961687>.
Leisch, Friedrich, "FlexMix: A General Framework for Finite Mixture Models and Latent Class Regression in R," Journal of Statistical Software, http://www.istasoft.org/, vol. 11 (8), pp. 1-18, Oct. 2004.
Liang, Jian, et al. "Load Signature Study—Part II: Disaggregation Framework, Simulation, and Applications," IEEE Transactions on Power Delivery, vol. 25, No. 2, pp. 561-569, Apr. 2010.
Liang, Jian, et al., "Load Signature Study—Part I: Basic Concept, Structure, and Methodology," IEEE Transactions on Power Delivery, vol. 25, No. 2, pp. 551-560, Apr. 2010.
Marshall, Jonathan, "PG&E Home Energy Reports Stimulate Big Customer Savings," posted at PG&E Currents, posting date May 14, 2014, © 2014 Pacific Gas and Electric Company, available at http://www.pgecurrents.com/2014/05/14/pgehomeenergyreports-stimulatebigcustomersavings/>.
Mint.com, "Budgets you'll actually stick to," Budgeting-Calculate and Categorize your spending, https://www.mint.com/how-it-works/budgeting/, 2 pages, Jul. 12, 2013.
Mint.com, "We're always on alert." Alerts for bills, fees & going over budget, https://www.mint.com/how-it-works/alerts/, 2 pages, Jul. 12, 2013.
Morabito, Kerri, "High User Campaign," posted at Kerri Morabito, posting date not given, © Kerri Morabito, 2015, available at <URL: http://www.kerrimorabito.com/high-user-campaign.html>.
Mori, Hiroyuki, "State-of-the-Art Overview on Data Mining in Power Systems," IEEE, pp. 33-37, 2006.
Muthen, Bengt, et al., Finite Mixture Modeling with Mixture Outcomes Using the EM Algorithm, Biometrics, vol. 55, pp. 463-469, Jun. 1999.
Nest, "The Learning Thermostat," http://www.nest.com/, 2 pages, Jul. 15, 2013.
Nike.com, "Nike + FuelBand. Tracks your all-day activity and helps you do more . . . ," http://www.nike.com/us/en_us/c/nikeplus-f..uelband, 7 pages, Jul. 15, 2013.
Rocheleau, Jake, "38 Amazingly Well-Designed Emoji Iconsets," posted at SpyreStudios, posting date Mar. 25, 2015, SpyreStudios © 2015, available at http://spyrestudios.com/38weildesignedemojiiconsets/>.
Rose, O. "Estimation of the Hurst Parameter of Long-Range Dependent Time Series," University of Wuirzburg, Institute of Computer Science, Research Report Series, Report No. 137, 15 pages, Feb. 1996.
Sawka, Michael N., et al., "Human Adaptations to Heat and Cold Stress," RTOMP-076, 16 pages, Oct. 2001.
Stephen, Bruce, et al. "Domestic Load Characterization Through Smart Meter Advance Stratification," IEEE Transactions on Smart Grid, Power Engineering Letter, vol. 3, No. 3, pp. 1571-1572, Sep. 2012.
Stoop, R., et al., "Calculation of Lyapunov exponents avoiding spurious elements," Physica D 50, pp. 89-94, May 1991.
Wang, Xiaozhe, et al. "Rule induction for forecasting method selection: meta-learning the characteristics of univariate time series," Faculty of information Technology, Department of Econometrics and Business Statistics, Monash University, pp. 1-34.
Wang, Xiaozhe, et al., "Characteristic-Based Clustering for Time Series Data," Data Mining and Knowledge Discovery, Springer Science & Business Media, LLC, vol. 13, pp. 335-364 (2006).
Wehrens, Ron, et al. "Self- and Super-organizing Maps in R: The kohonen Package," Journal of Statistical Software, vol. 21, lss. 5, pp. 1-19, Oct. 2007.
Wikipedia, "Akaike information criterion," 6 pages, Aug. 17, 2012.
Wikipedia, "Mixture model," 10 pages, Oct. 7, 2012.

* cited by examiner

THERMOSTAT SET POINT IDENTIFICATION

BACKGROUND

Field

The present disclosure relates generally to energy conservation and more specifically to thermostat set point identification.

Description of the Related Art

Heating and cooling usage is often a significant driver of energy use. These loads are dependent upon customer-defined heating and cooling set points, which determine the thresholds for heating, ventilation, and air conditioning (HVAC) system operation. Various efforts have been made to reduce energy use associated with heating and cooling usage.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Identifying thermostat set points configured by individual users may be used for various applications, including estimating heating and cooling loads, estimating usage not attributable to heating and cooling, identifying heating and cooling system characteristics, identifying utility customers who are outliers in terms of heating and cooling use, generating normative comparisons based on thermostat set points and energy use, identifying likely purchasers of energy efficient products, recommending better utility rates, identifying behavioral changes, and identifying customers to participate in utility demand response programs.

Figure 1:
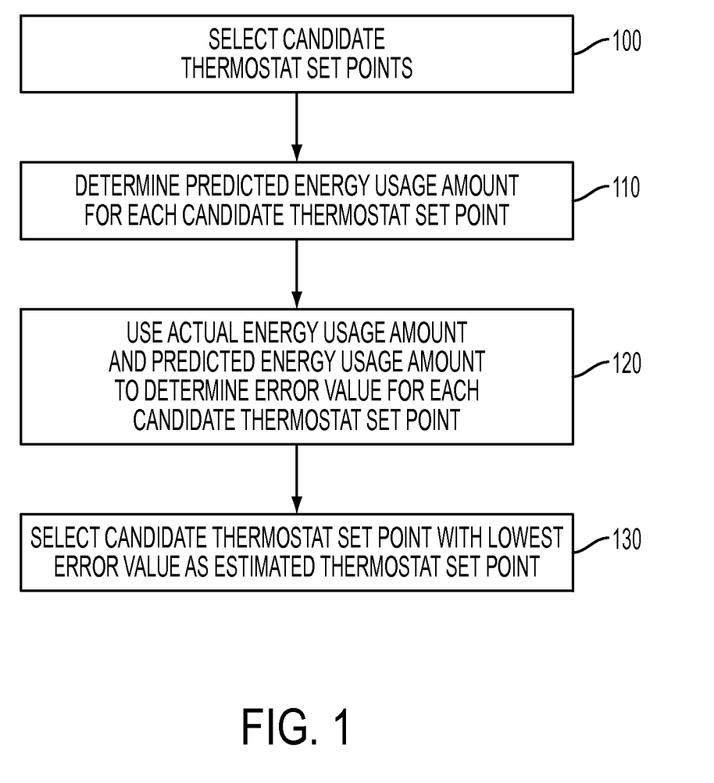
FIG. 1 is a flow diagram illustrating a process for estimating a thermostat set point, according to an embodiment.

FIG. 1 is a flow diagram illustrating a process for estimating a thermostat set point, according to an embodiment. A thermostat set point may correspond to a particular utility customer, tenant, or other user and represent a desired heating temperature set on that utility customer, tenant, or other user's thermostat. A heating system may be controlled by the thermostat so that it runs when the measured temperature is lower than the set point temperature.

In another embodiment, a thermostat set point may represent a desired cooling temperature set on a thermostat. A cooling system may be controlled by the thermostat so that it runs when the measured temperature is higher than the set point temperature.

In yet another embodiment, a thermostat set point may represent a pair of desired heating and cooling temperatures. A heating system may be controlled by the thermostat so that it runs when the measured temperature is lower than the heating set point temperature from the pair of desired heating and cooling temperatures. A cooling system may also be controlled by the thermostat so that it runs when the measured temperature is higher than the cooling set point temperature from the pair of desired heating and cooling temperatures.

A utility customer, tenant, or other user may set a thermostat set point for a single thermostat, or a utility customer, tenant, or other user may set a plurality of thermostat set points corresponding to a plurality of thermostats. The process for estimating a thermostat set point may estimate a thermostat set point for a single thermostat, or the process may estimate a plurality of thermostat set points corresponding to a plurality of thermostats.

Referring to FIG. 1, a plurality of candidate thermostat set points is selected in block 100. According to an embodiment, the plurality of candidate thermostat set points may include heating set points, cooling set points, or pairs of heating and cooling set points. The candidate thermostat set points may correspond to one or more thermostats controlling each of a utility customer's heating and/or cooling systems. The candidate thermostat set points may include heating set points falling within a predetermined range of possible heating set points (e.g., 50 degrees to 80 degrees) and cooling set points falling within a predetermined range of possible cooling set points (e.g., 60 degrees to 90 degrees). According to another embodiment, an initial set of candidate thermostat set points may be selected using a range of typical set points.

For each of the plurality of candidate thermostat set points, a predicted energy usage amount is determined in block 110. The predicted energy usage amount is an expected energy consumption quantity over a particular time period corresponding to a particular candidate thermostat set point (or set point pair), assuming a particular outside temperature, and using coefficients $b_0$, $b_1$, and $b_2$ which may be learned using an actual energy usage amount (e.g., by performing a standard linear regression) or set. The predicted energy usage amount may be calculated using [formula 1], below. The predicted energy usage amount may be expressed as a quantity of electricity (e.g., a certain number of kilowatt-hours), a quantity of natural gas (e.g., a certain number of therms or cubic feet), or a quantity of any other resource (e.g., steam, hot water, heating oil, etc.) supplied by a utility or energy provider.

Next, in block 120, for each candidate thermostat set point, the predicted energy usage amount corresponding to the candidate thermostat set point is compared with the actual energy usage amount to determine an error value for the candidate thermostat set point. The actual energy usage amount may be provided by the utility, retrieved from a server belonging to the utility, obtained from a database, obtained from a utility customer, or obtained in any other way. According to an embodiment, a first candidate thermostat set point having a predicted energy usage amount that is less accurate as compared to the actual energy usage amount will have a higher error value than a second candidate thermostat set point having a predicted energy usage amount that is more accurate as compared to the actual energy usage amount. Accuracy may be determined based on a difference between the actual energy usage amount and the predicted energy usage amount.

For example, assume that the first candidate thermostat set point corresponding to a first time period is a heating set point of 68° F., and the second candidate thermostat set point corresponding to the first time period is a heating set point of 69° F. Assume that the predicted energy usage amount associated with the first candidate thermostat set point for the first time period is 0.100 therms of natural gas, and the predicted energy usage amount associated with the second candidate thermostat set point for the first time period is 0.112 therms of natural gas. If data from a utility company indicates that the actual energy usage amount for the first time period is 0.0998 therms of natural gas, then the error value for the first candidate thermostat set point would be lower than the error value for the second candidate thermostat set point, since the difference between the actual energy usage amount and the predicted energy usage amount associated with the first candidate thermostat set point is smaller than the difference between the actual energy usage amount and the predicted energy usage amount associated with the second candidate thermostat set point.

As discussed in additional detail below, penalty values may be introduced that increase the error value for candidate thermostat set points that are a priori more unlikely. Alternatively, various penalty functions may be used to assign penalty values.

Next, in block 130 of FIG. 1, the candidate thermostat set point having the lowest error value among all of the plurality of candidate thermostat set points is selected as the estimated thermostat set point.

Figure 2:
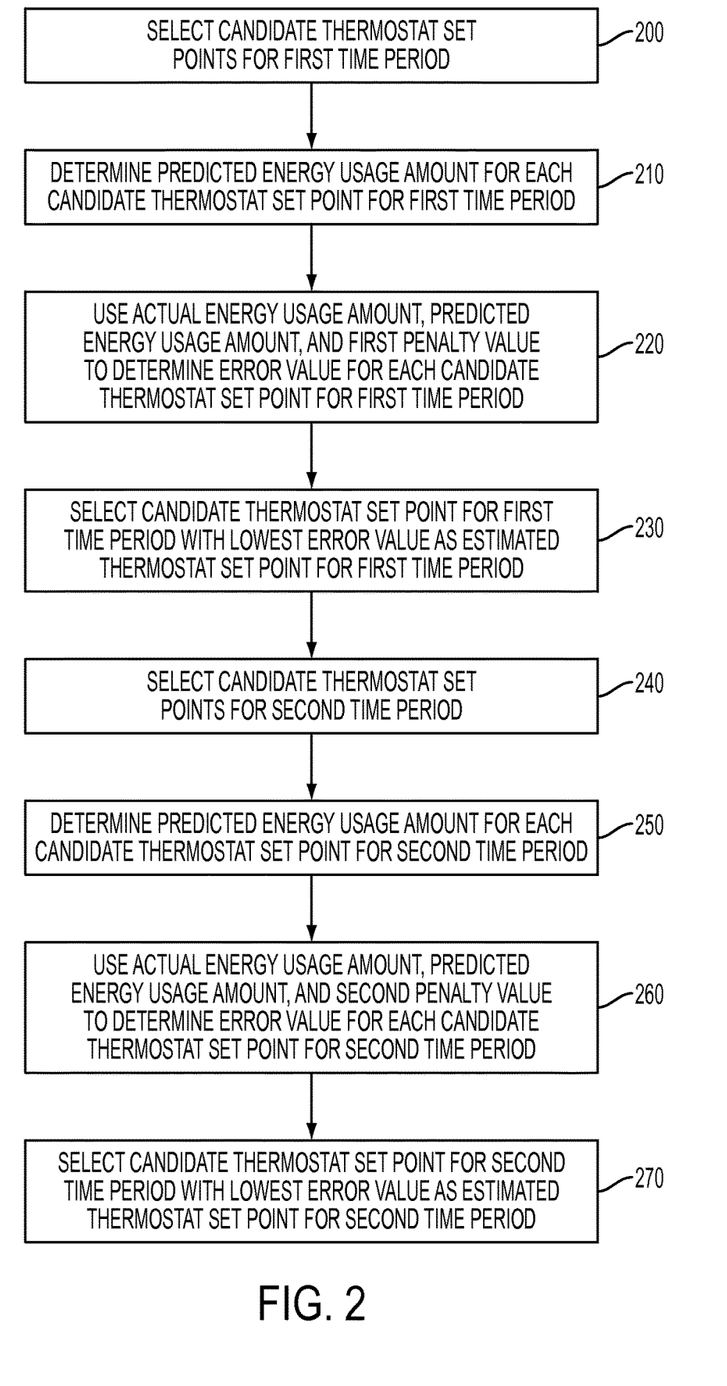
FIG. 2 is a flow diagram illustrating a process for estimating a thermostat set point for a first time period and a thermostat set point for a second time period, according to an embodiment.

FIG. 2 is a flow diagram illustrating a process for estimating a thermostat set point for a first time period and a thermostat set point for a second time period, according to an embodiment. For example, a first thermostat set point may be used for a first time of the day, and a second thermostat set point may be used for a second time of the day. Alternatively, a first thermostat set point may be used for a first day of the week, and a second thermostat set point may be used for a second day of the week. Different thermostat set points may also correspond to different use cases, such as "home," "away," and "sleep." A plurality of candidate thermostat set points for a first time period is selected in block 200. According to an embodiment, the plurality of candidate thermostat set points may include heating set points, cooling set points, or pairs of heating and cooling set points.

For each of the plurality of candidate thermostat set points for the first time period, a predicted energy usage amount is determined in block 210. The predicted energy usage amount is an expected energy consumption quantity over the first time period corresponding to a particular candidate thermostat set point.

Next, in block 220, for each candidate thermostat set point for the first time period, the predicted energy usage amount for the first time period corresponding to the candidate thermostat set point is compared with the actual energy usage amount for the first time period to determine an error value for the candidate thermostat set point. Additionally, a first penalty value may be introduced that increases the error value for candidate thermostat set points that are a priori more unlikely. The first penalty value may be assigned varying weights that determine the importance of the first penalty value in relation to the prediction accuracy.

Various penalty functions may be used to assign penalty values such as the first penalty value. For example, an analysis of actual thermostat set points used by utility customers may be used to create a distribution of thermostat set points based on the number of people that use each particular thermostat set point. A penalty function may be used that assigns a higher penalty value to infrequently used thermostat set points in comparison with more frequently used thermostat set points. Alternatively, information from the United States Energy Information Administration (EIA) or similar public or proprietary energy information sources may be used to determine the relative likelihood of each thermostat set point in the plurality of candidate thermostat set points, and larger penalty values may be assigned to candidate thermostat set points that are more unlikely according to EIA information.

Additionally, a penalty function may be used that assigns penalty values that are proportional to the actual distribution which may be determined using data on set points that are actually used by utility customers, tenants, or other users (e.g., the inverse of the proportion of a particular candidate thermostat set point, or the negative logarithm of the proportion of a particular candidate thermostat set point).

Alternatively, a group of candidate thermostat set points may be deemed "likely" and each assigned the same small penalty value, and the other candidate thermostat set points that are not in the group of "likely" candidate thermostat set points may be assigned the same large penalty value. One such type of penalty may be based on the relative values of the set points (how close/far they are from each other), rather than the absolute values of the set points.

Referring back to FIG. 2, next, in block 230, the candidate thermostat set point for the first time period having the lowest error value among all of the plurality of candidate thermostat set points for the first time period is selected as the estimated thermostat set point for the first time period.

Next, in block 240, a plurality of candidate thermostat set points for a second time period is selected. According to an embodiment, the plurality of candidate thermostat set points may include heating set points, cooling set points, or pairs of heating and cooling set points.

For each of the plurality of candidate thermostat set points for the second time period, a predicted energy usage amount for the second time period is determined in block 250. The predicted energy usage amount is an expected energy consumption quantity over the second time period corresponding to a particular candidate thermostat set point.

Next, in block 260, for each candidate thermostat set point for the second time period, the predicted energy usage amount for the second time period corresponding to the candidate thermostat set point is compared with the actual energy usage amount for the second time period to determine an error value for the candidate thermostat set point. Additionally, a second penalty value may be introduced that increases the error value for candidate thermostat set points that are a priori more unlikely.

The second penalty value may also serve to tie together the first time period and the second time period. For example, thermostat set points are unlikely to fluctuate significantly from one hour to the next. Accordingly, for adjacent time periods, the second penalty value may be used to penalize candidate thermostat set points that are far away from each other. The second penalty value may be assigned varying weights that determine the importance of the second penalty value in relation to the prediction accuracy.

Next, in block 270, the candidate thermostat set point for the second time period having the lowest error value among all of the plurality of candidate thermostat set points for the second time period is selected as the estimated thermostat set point for the second time period.

The process of selecting a plurality of candidate thermostat set points, determining predicted energy usage for each of the plurality of candidate thermostat set points, determining error values for each of the plurality of candidate thermostat set points, and selecting the candidate thermostat set point having the lowest error value among the plurality of candidate thermostat set points may be repeated to determine estimated thermostat set points for additional time periods. The time periods may be adjacent time periods. For example, a day may be divided into 24 one-hour time periods, and thermostat set points may be estimated for each of the 24 one-hour time periods. Alternatively, a day may be divided into time periods of unequal lengths, for example, time periods corresponding to "night" (e.g., 12 a.m. to 6 a.m.), "morning," (e.g., 6 a.m. to 9 a.m.), "daytime" (e.g. 9 a.m. to 6 p.m.), and "evening" (e.g., 6 p.m. to 11:59 p.m.), and thermostat set points may be estimated for each of these periods. According to another embodiment, the time periods may be non-adjacent and arbitrarily selected, and thermostat set points may be estimated for each of these periods.

Figure 3:
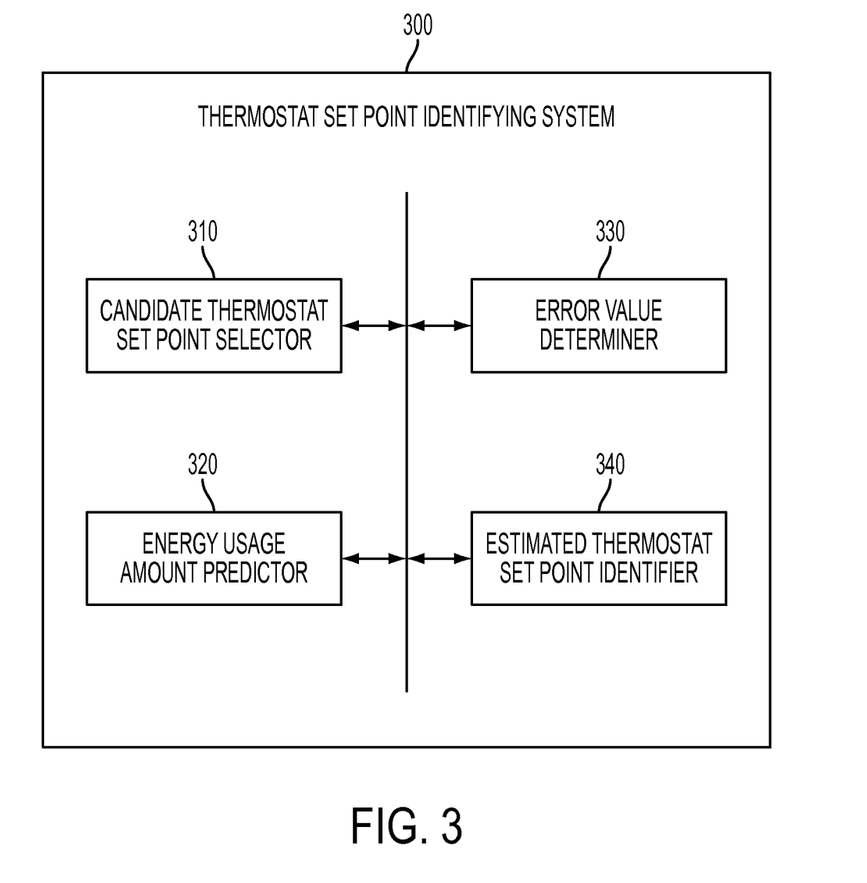
FIG. 3 is a block diagram illustrating a thermostat set point identifying system, according to an embodiment.

FIG. 3 is a block diagram that illustrates an embodiment of a thermostat set point identifying system 300 which includes a candidate thermostat set point selector 310, an energy usage amount predictor 320, an error value determiner 330, and an estimated thermostat set point identifier 340.

According to an embodiment, the candidate thermostat set point selector 310 selects a plurality of candidate thermostat set points. The energy usage amount predictor 320 uses a processor to determine, for each of the plurality of candidate thermostat set points, a predicted energy usage amount corresponding to the candidate thermostat set point. The error value determiner 330 determines, for each of the plurality of candidate thermostat set points, an error value corresponding to the candidate thermostat set point using an actual energy usage amount and the predicted energy usage amount corresponding to the candidate thermostat set point. The estimated thermostat set point identifier 340 identifies an estimated thermostat set point by selecting, from the plurality of candidate thermostat set points, the candidate thermostat set point having the error value that is lowest.

According to another embodiment, the estimated thermostat set point identified by the estimated thermostat set point identifier 340 corresponds to a first time period. The candidate thermostat set point selector 310 may further select a plurality of second candidate thermostat set points corresponding to a second time period that is adjacent to the first time period. The energy usage amount predictor 320 may further use the processor to determine, for each of the plurality of second candidate thermostat set points, a predicted energy usage amount corresponding to the second candidate thermostat set point. The error value determiner 330 may further determine, for each of the plurality of candidate thermostat set points, an error value corresponding to the second candidate thermostat set point using an actual energy usage amount corresponding to the second time period, the predicted energy usage amount corresponding to the second candidate thermostat set point, and a second penalty value based on a predetermined likelihood of the second candidate thermostat set point. Finally, the estimated thermostat set point identifier 340 may further identify a second estimated thermostat set point that corresponds to the second time period by selecting, from the plurality of second candidate thermostat set points, the second candidate thermostat set point having the error value that is lowest.

Once an estimated thermostat set point is determined, the system may identify the customer as having an inefficient thermostat set point. Accordingly, the system may provide the customer with information and tools to help the customer better manage their heating and cooling usage. The customer may be provided with information about energy efficiency and/or a more efficient thermostat set point, relative to their current estimated thermostat set point (e.g., adjusting their heating set point down by two degrees from their estimated heating set point). The estimated thermostat set point may be used to make normative comparisons against other customers. For example, a customer may be told that the average heating set point in their neighborhood is 68 degrees, but their estimated thermostat set point is 72 degrees. Additionally, homes that have efficient thermostat set points but still use a lot of energy heating or cooling may be identified by the system, and the system may inform those customers of a possible issue and recommend that an HVAC contractor look at their system.

According to an embodiment, the information provided to the customer may be in the form of paper reports (either included with utility bills or as separate mailings), e-mails, text messages, web site content, or in other forms. According to another embodiment, an application programming interface may be provided, and a utility may pull the data and include it on customers' bills and/or use the data for other purposes. The data may also be utilized by an application developed by a utility or utility partner.

Figure 4:
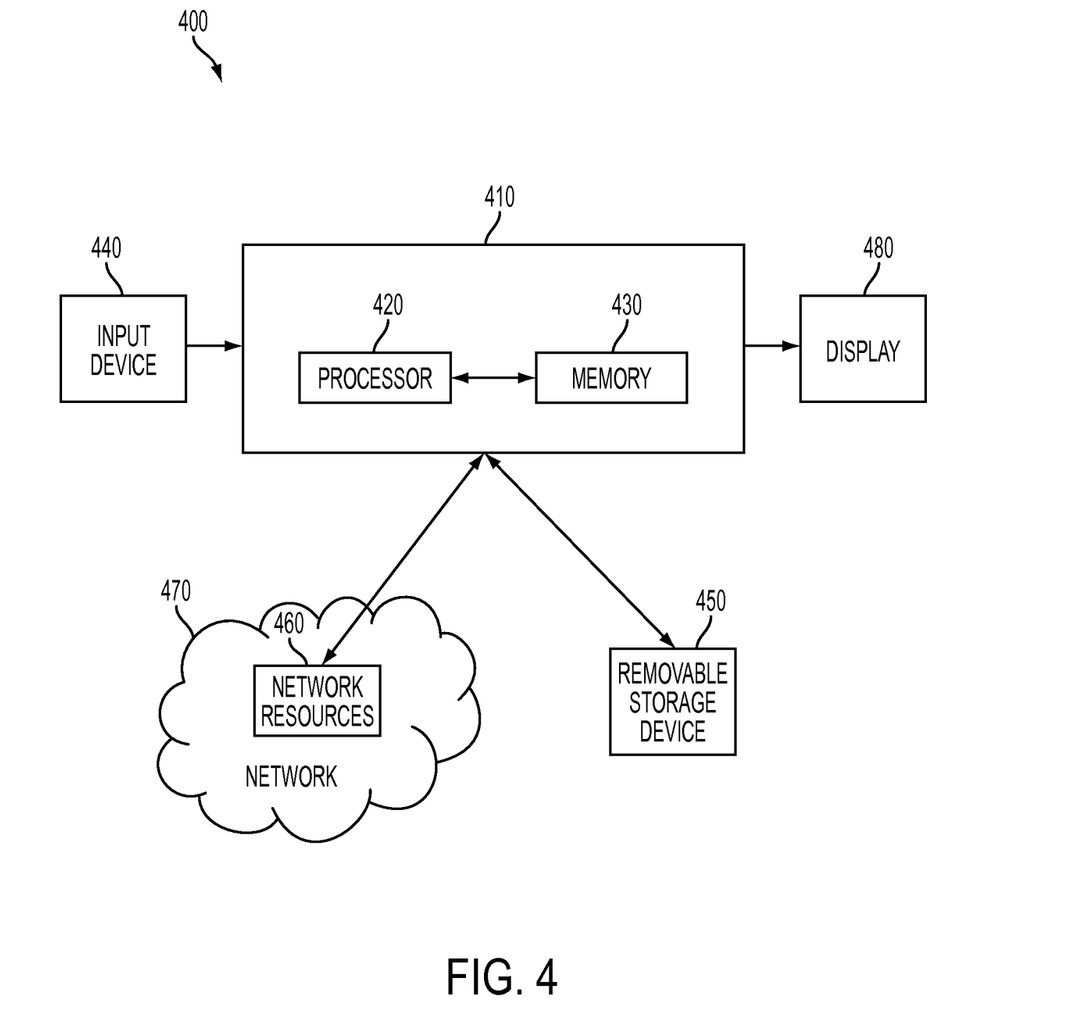
FIG. 4 is a block diagram illustrating a computer system upon which the system may be implemented, according to an embodiment.

FIG. 4 is a block diagram that illustrates an embodiment of a computer/server system 400 upon which an embodiment may be implemented. The system 400 includes a computer/server platform 410 including a processor 420 and memory 430 which operate to execute instructions, as known to one of skill in the art. The term "computer-readable storage medium" as used herein refers to any tangible medium, such as a disk or semiconductor memory, that participates in providing instructions to processor 420 for execution. Additionally, the computer platform 410 receives input from a plurality of input devices 440, such as a keyboard, mouse, touch device, touchscreen, or microphone. The computer platform 410 may additionally be connected to a removable storage device 450, such as a portable hard drive, optical media (CD or DVD), disk media, or any other tangible medium from which a computer can read executable code. The computer platform 410 may further be connected to network resources 460 which connect to the Internet or other components of a local public or private network. The network resources 460 may provide instructions and data to the computer platform 410 from a remote location on a network 470. The connections to the network resources 460 may be via wireless protocols, such as the 802.11 standards, Bluetooth® or cellular protocols, or via physical transmission media, such as cables or fiber optics. The network resources may include storage devices for storing data and executable instructions at a location separate from the computer platform 410. The computer platform 410 interacts with a display 480 to output data and other information to a utility customer, tenant, or other user, as well as to request additional instructions and input from the utility customer, tenant, or other user. The display 480 may be a touchscreen display and may act as an input device 440 for interacting with a utility customer, tenant, or other user.

Figure 5:
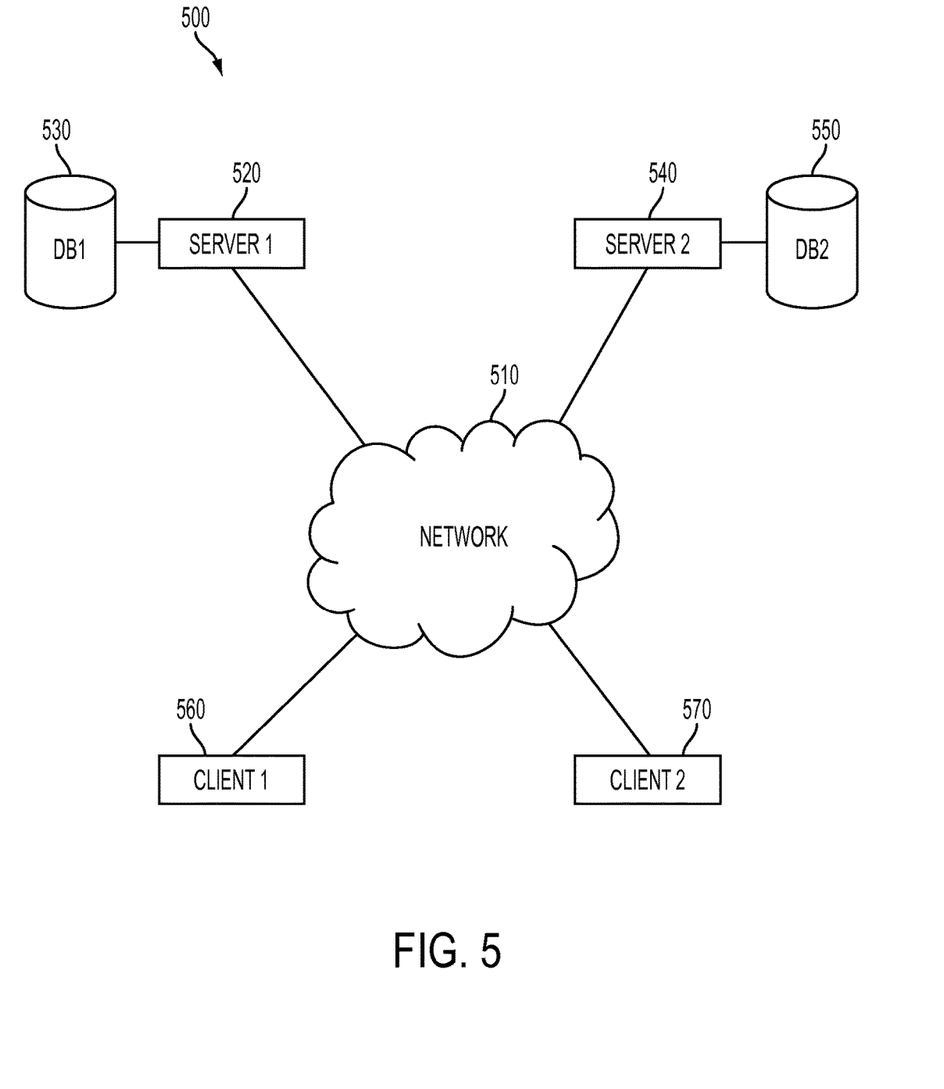
FIG. 5 is a block diagram that illustrates an embodiment of a network including servers upon which the system may be implemented and client machines that communicate with the servers.

FIG. 5 is a block diagram that illustrates an embodiment of a network 500 including servers 520, 540 upon which the system may be implemented and client machines 560, 570 that communicate with the servers 520, 540. The client machines 520, 540 communicate across the Internet or another wide area network (WAN) or local area network (LAN) 510 with server 1 520 and server 2 540. Server 1 520 communicates with database 1 530, and server 2 540 communicates with database 2 550. According to an embodiment, one or both of server 1 520 and server 2 540 may implement a thermostat set point identifying system. Client 1 560 and/or client 2 570 may interface with the thermostat set point identifying system and request server 1 520 and/or server 2 540 to perform processing to identify thermostat set points. Server 1 520 may communicate with or otherwise receive information from database 1 530 or another internal or external data source or database in the process of identifying thermostat set points at the request of a client, and server 2 540 may communicate with database 2 550 or another internal or external data source or data base in the process of identifying thermostat set points at the request of a client.

According to an embodiment, the system may use an objective function to estimate heating and cooling set points for each time of day, on any date, for every customer. The function may use some or all of the following data as inputs: (1) sub-daily usage data (e.g., 24-96 periods/day), daily usage data, and/or monthly usage data; (2) hourly weather information (e.g., temperature, wind speed, and/or humidity, etc.); (3) site-level information (e.g., heat-type [electric, natural gas, oil, etc.]), building type [single family residence, multi family residence, etc.], building age, building size, demographic, etc.); (4) location information (e.g., latitude and longitude, zip code, city/state, etc.); and (5) sources of set points (e.g., thermostats' actual set points, controlled set points, etc.). The usage data may be provided by one or more utility companies for one or more utilities (e.g., electricity, natural gas, oil, etc.). Alternatively, the usage data may be provided by other sources, including but not limited to customers or customer-owned devices. According to an embodiment, data from nine or more months of historical usage may be provided as the utility data. Alternatively, historical usage data corresponding to a shorter period may be provided as the utility data.

According to an embodiment, heating/cooling disaggregation (i.e., the portion of total energy use that is attributable to heating/cooling use) may be modeled as a function of heating and cooling degree days, letting the balance point temperatures (i.e., the outdoor air temperature required for the indoor air temperature to be comfortable without the use of mechanical heating or cooling) be parameters that are estimated instead of a fixed number (i.e., 65). The model takes the form:

$$kWh = b_0 + b_1 \max(0, t_h - \text{temp}) + b_2 \max(0, \text{temp} - t_c) \text{ subject to } t_c \geq t_h, t_c \in [\min t_c, \max t_c], \text{ and } t_h \in [\min t_h, \max t_h].$$ [formula 1]

The equations that follow may use some or all of the following terms:
$kWh_{actual}$: actual usage in kilowatt hours over a given period (e.g., as measured by a utility);
$kWh_{predicted}$: predicted usage in kilowatt hours over a given period assuming temp, $t_h$, $t_c$, and b;
$b(b_0, b_1, b_2, \ldots)$: real-valued vector of coefficients;
$t_h$: temperature of heating set point in degrees (for a given time frame) (according to an embodiment, $t_h \in [55, 70]$);
$t_c$: temperature of cooling set point in degrees (for a given time frame) (according to an embodiment, $t_c \in [60, 85]$); and
temp: outside temperature.

According to an embodiment, the optimal candidate thermostat set points may be selected by fitting $b_0$, $b_1$, and $b_2$ for each pair of heating and cooling set points $(t_h, t_c)$ within the bounds defined by min $t_h$ and max $t_h$ and by min $t_c$ and max $t_c$ above. The optimal pair of candidate thermostat set points will be those that minimize the error of (formula 1) given by:

$$(kWh_{actual} - kWh_{predicted}(b, t_h, t_c, \text{temp}))^2$$ [objective function 1]

According to another embodiment, penalties or scores associated with various candidate thermostat set point values may be introduced to guide towards more reasonable or likely estimated set points. The above model calls for minimizing the error given by [objective function 1], where $kWh_{actual}$ is the observed usage and $kWh_{predicted}$ is the usage predicted by [formula 1] with the inputs b, $t_h$, $t_c$, and temp. It is possible that a candidate thermostat set point that may be considered a priori unlikely (e.g., 85) achieves a slightly lower error as given by [objective function 1] than a candidate thermostat set point that is more likely (e.g., 75). Thus, [objective function 1] may be modified to add a penalty term:

$$(kWh_{actual} - kWh_{predicted}(b, t_h, t_c, \text{temp}))^2 + \alpha_h p_h(t_h) + \alpha_c p_c(t_c)$$ [objective function 2]

where $p_h$ and $p_c$ are penalty functions that assign a higher penalty to candidate thermostat set points that are a priori more unlikely, and $\alpha_h$ and $\alpha_c$ are weights that dictate how important these penalty functions are compared to the prediction error. The penalty functions may be learned from training data or be provided by estimates from an external data source.

According to another embodiment, the penalty terms may also be used to tie together different time periods to estimate more realistic thermostat set points. For example, the model may be run separately on each hour of the day to estimate 24 pairs of heating and cooling set points independently, but this might yield estimated thermostat set points that fluctuate from one hour to the next, which is unlikely to be accurate. This problem may be alleviated by adding a term $p(t_h^1, t_h^2)$, where $t_h^1$ is the heating set point in one hour and $t_h^2$ is the heating set point in the next hour, that for adjacent time periods penalizes candidate thermostat set points that are far away from each other:

$$(kWh_{actual} - kWh_{predicted}(b, t_h, t_c, \text{temp}))^2 + \alpha_h p_h(t_h) + \alpha_c p_c(t_c) + \alpha_h' p(t_h^1, t_h^2) + \alpha_c' p(t_c^1, t_c^2)$$ [objective function 3]

According to an embodiment, once an estimated thermostat set point is determined, customers that have inefficient thermostat set points may be provided with information and tools to help them better manage their heating and cooling usage. These customers may be provided with information about energy efficiency and/or a more efficient thermostat set point, relative to their current estimated thermostat set point (e.g., adjusting their heating set point down by two degrees from their estimated heating set point). The estimated thermostat set point may be used to make normative comparisons against other customers. For example, a customer may be told that the average heating set point in their neighborhood is 68 degrees, but their estimated thermostat set point is 72 degrees. Additionally, homes that have efficient thermostat set points but still use a lot of energy heating or cooling may be identified, and those customers may be recommended to have an HVAC contractor look at their system. The estimated thermostat set points may also be used to infer whether utility customers, tenants, or other users are programming their thermostats and suggesting appropriate courses of action (e.g., setting a lower away set point).

According to an embodiment, this information may be provided in the form of paper reports (either included with utility bills or as separate mailings), e-mails, text messages, web site content, or in other forms. According to another embodiment, an application programming interface may be provided, and a utility may pull the data and include it on customers' bills and/or use the data for other purposes. The data may also be utilized by an application developed by a utility or utility partner.

By tracking this information over time, thermostat set point changes that are recorded may be used to more accurately estimate energy savings attributable to other energy savings programs. For example, a utility may provide incentives to a customer to improve insulation in their home. The utility doesn't necessarily know what level of energy savings will result from this program. By tracking how thermostat set points change throughout this process, a utility may be able to more accurately measure energy savings from other programs as opposed to energy savings from changing thermostat set points.

Tracking drift in the estimated thermostat set point may also be useful for identifying degradation in system performance. When such degradation in system performance is identified based on observed changes in customer comfort, a utility may dispatch a service technician to address the degradation in system performance.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A computer-implemented method performed by a computer system, where the computer system includes a processor for executing instructions from a memory, the method comprising:
    selecting a plurality of candidate thermostat set points;
    for each of the plurality of candidate thermostat set points, determining, using a processor, a predicted energy usage amount corresponding to the candidate thermostat set point;
    retrieving an actual energy usage amount from a server computer over a computer network, wherein the actual energy usage amount is associated with a customer;
    for each of the plurality of candidate thermostat set points, determining, using the processor, an error value corresponding to the candidate thermostat set point using the actual energy usage amount and the predicted energy usage amount corresponding to the candidate thermostat set point;
    for one or more candidate thermostat set points that are infrequently used by customers relative to other thermostat set points, increasing the error value for the one or more candidate thermostat set points by a penalty value;
    identifying, using the processor, an estimated thermostat set point by selecting, from the plurality of candidate thermostat set points, the candidate thermostat set point having the error value that is lowest relative to the error values of the other candidate thermostat set points; and
    generating and transmitting a message to the customer with information including the estimated thermostat set point to cause the customer to adjust a thermostat set point in a thermostat, associated with the customer, to the estimated thermostat set point.

2. The method of claim 1, wherein the estimated thermostat set point is a heating set point or a cooling set point.

3. The method of claim 1, wherein the estimated thermostat set point comprises a paired heating set point and cooling set point.

4. The method of claim 1, wherein the actual energy usage amount used in the determining the predicted energy usage amount is based on energy usage data corresponding to the customer, and
    wherein the estimated thermostat set point corresponds to the customer.

5. The method of claim 1, wherein increasing the error value by the penalty value includes assigning the penalty value using a penalty function.

6. The method of claim 1, wherein the estimated thermostat set point corresponds to a first time period, and wherein the method further comprises:
    selecting a plurality of second candidate thermostat set points corresponding to a second time period that is adjacent to the first time period;
    for each of the plurality of second candidate thermostat set points, determining, using the processor, a second predicted energy usage amount corresponding to the second candidate thermostat set point;
    for each of the plurality of second candidate thermostat set points, determining a second error value corresponding to the second candidate thermostat set point using:
        a second actual energy usage amount corresponding to the second time period,
        the second predicted energy usage amount corresponding to the second candidate thermostat set point, and
        a second penalty value; and
    identifying a second estimated thermostat set point that corresponds to the second time period by selecting, from the plurality of second candidate thermostat set points, the second candidate thermostat set point having the second error value that is lowest.

7. The method of claim 6, wherein the second penalty value is higher for the second candidate thermostat set points that are farther away from the estimated thermostat set point corresponding to the first time period, and wherein the second penalty value is lower for the second candidate thermostat set points that are nearer to the estimated thermostat set point corresponding to the first time period.

8. A non-transitory computer readable medium storing instructions that, when executed by a processor of a computer system, cause the computer system to:
    select, by at least the processor, a plurality of candidate thermostat set points;
    for each of the plurality of candidate thermostat set points, determine, using the processor, a predicted energy usage amount corresponding to the candidate thermostat set point;

retrieve an actual energy usage amount from a server computer over a computer network, wherein the actual energy usage amount is associated with a customer;

for each of the plurality of candidate thermostat set points, determine, using the processor, an error value corresponding to the candidate thermostat set point using the actual energy usage amount and the predicted energy usage amount corresponding to the candidate thermostat set point;

for one or more candidate thermostat set points that are infrequently used by customers relative to other thermostat set points, increase the error value for the one or more candidate thermostat set points by a penalty value;

identify, by at least the processor, an estimated thermostat set point by selecting, from the plurality of candidate thermostat set points, the candidate thermostat set point having the error value that is lowest relative to the error values of the other candidate thermostat set points; and generate and transmit a message to the customer with information including the estimated thermostat set point to cause the customer to adjust a thermostat set point in a thermostat, associated with the customer, to the estimated thermostat set point.

9. The non-transitory computer readable medium of claim 8, wherein the estimated thermostat set point is a heating set point or a cooling set point.

10. The non-transitory computer readable medium of claim 8, wherein the estimated thermostat set point comprises a paired heating set point and cooling set point.

11. The non-transitory computer readable medium of claim 8, wherein the actual energy usage amount used in the determining the predicted energy usage amount is based on energy usage data corresponding to the customer, and
wherein the estimated thermostat set point corresponds to the customer.

12. The non-transitory computer readable medium of claim 8, wherein increasing the error value by the penalty value includes assigning the penalty value using a penalty function.

13. The non-transitory computer readable medium of claim 8, wherein the estimated thermostat set point corresponds to a first time period, and wherein the method further comprises:
selecting a plurality of second candidate thermostat set points corresponding to a second time period that is adjacent to the first time period;
for each of the plurality of second candidate thermostat set points, determining, using the processor, a second predicted energy usage amount corresponding to the second candidate thermostat set point;
for each of the plurality of second candidate thermostat set points, determining a second error value corresponding to the second candidate thermostat set point using:
a second actual energy usage amount corresponding to the second time period,
the second predicted energy usage amount corresponding to the second candidate thermostat set point, and
a second penalty value; and
identifying a second estimated thermostat set point that corresponds to the second time period by selecting, from the plurality of second candidate thermostat set points, the second candidate thermostat set point having the second error value that is lowest.

14. The non-transitory computer readable medium of claim 13, wherein the second penalty value is higher for the second candidate thermostat set points that are farther away from the estimated thermostat set point corresponding to the first time period, and wherein the second penalty value is lower for the second candidate thermostat set points that are nearer to the estimated thermostat set point corresponding to the first time period.

15. A computer system, the computer system comprising:
a processor;
a selector stored in a non-transitory computer-readable medium including instructions that when executed cause the processor to select a plurality of candidate thermostat set points;
a predictor stored in the non-transitory computer-readable medium including instructions that when executed cause the processor to, for each of the plurality of candidate thermostat set points, determine a predicted energy usage amount corresponding to the candidate thermostat set point;
an error value determiner stored in the non-transitory computer-readable medium including instructions that when executed cause the processor to:
retrieve an actual energy usage amount from a server computer over a computer network, wherein the actual energy usage amount is associated with a customer,
for each of the plurality of candidate thermostat set points, determine an error value corresponding to the candidate thermostat set point using an actual energy usage amount and the predicted energy usage amount corresponding to the candidate thermostat set point; and
for one or more candidate thermostat set points that are infrequently used by customers relative to other thermostat set points, increasing the error value for the one or more candidate thermostat set points by a penalty value; and
an estimated thermostat set point identifier stored in the non-transitory computer-readable medium including instructions that when executed cause the processor to:
identify an estimated thermostat set point by selecting, from the plurality of candidate thermostat set points, the candidate thermostat set point having the error value that is lowest relative to the error values of the other candidate thermostat set points, and
generate and transmit a message to the customer with information including the estimated thermostat set point to cause the customer to adjust a thermostat set point in a thermostat, associated with the customer, to the estimated thermostat set point.

16. The computer system of claim 15, wherein the estimated thermostat set point identified by the estimated thermostat set point identifier is a heating set point or a cooling set point.

17. The computer system of claim 15, wherein the estimated thermostat set point identified by the estimated thermostat set point identifier comprises a paired heating set point and cooling set point.

18. The computer system of claim 15, wherein the actual energy usage amount used by the predictor is based on energy usage data corresponding to the customer, and
wherein the estimated thermostat set point identified by the estimated thermostat set point identifier corresponds to the customer.

19. The computer system of claim 15, wherein the error value determiner is configured to increase the error value by the penalty value that is assigned using a penalty function.

20. The computer system of claim 15, wherein:

the estimated thermostat set point identified by the estimated thermostat set point identifier corresponds to a first time period;

the selector further selects a plurality of second candidate thermostat set points corresponding to a second time period that is adjacent to the first time period;

the predictor, for each of the plurality of second candidate thermostat set points, determines, using the processor, a second predicted energy usage amount corresponding to the second candidate thermostat set point;

the error value determiner, for each of the plurality of second candidate thermostat set points, determines a second error value corresponding to the second candidate thermostat set point using:

a second actual energy usage amount corresponding to the second time period, the second predicted energy usage amount corresponding to the second candidate thermostat set point, and a second penalty value; and the estimated thermostat set point identifier identifies a second estimated thermostat set point that corresponds to the second time period by selecting, from the plurality of second candidate thermostat set points, the second candidate thermostat set point having the second error value that is lowest.

21. The computer system of claim 20, wherein the second penalty value is higher for the second candidate thermostat set points that are farther away from the estimated thermostat set point corresponding to the first time period, and wherein the second penalty value is lower for the second candidate thermostat set points that are nearer to the estimated thermostat set point corresponding to the first time period.

* * * * *